United States Patent [19]

Shaw et al.

[11] Patent Number: 5,246,283

[45] Date of Patent: Sep. 21, 1993

[54] ELECTRO-HYDRAULIC BRAKE APPLY SYSTEM

[75] Inventors: Schuyler S. Shaw, Dayton; John B. Hageman; Donald E. Schenk, both of Vandalia, all of Ohio

[73] Assignee: General Motors Corporation, Detroit, Mich.

[21] Appl. No.: 942,015

[22] Filed: Sep. 8, 1992

[51] Int. Cl.⁵ .......................... B60T 8/34; B60T 8/48
[52] U.S. Cl. ..................... 303/115.2; 303/3; 303/113.2
[58] Field of Search ............... 303/113.2, 113.1, 116.1, 303/116.2, 115.1, 115.2, 115.4, DIG. 3, DIG. 4, 110, 3.15; 180/197

[56] References Cited

U.S. PATENT DOCUMENTS

| | | | |
|---|---|---|---|
| 4,768,843 | 9/1988 | Baughman et al. | 303/DIG. 4 |
| 4,950,028 | 8/1990 | Harrison | 303/115.2 |
| 5,115,116 | 5/1992 | Mikhaeil-Boules et al. | 303/115.2 |
| 5,150,951 | 9/1992 | Leiber et al. | 303/DIG. 4 |

FOREIGN PATENT DOCUMENTS

| | | | |
|---|---|---|---|
| 448031 | 9/1991 | European Pat. Off. | 303/115.2 |
| 63-8058 | 1/1988 | Japan | 303/115.2 |

*Primary Examiner*—Matthew C. Graham
*Attorney, Agent, or Firm*—Ernest E. Helms

[57] ABSTRACT

An electro-hydraulic braking system for a vehicle is provided including, in a preferred embodiment, a master cylinder, an alpha first pressure transducer providing a signal in response to the pressure of the fluid delivered by the master cylinder, an accumulator for accepting fluid from the master cylinder, an electric actuator for delivering and relieving pressurized fluid to the brake in response to the alpha pressurizer transducer in a normal mode of operation, an isolation valve isolating the master cylinder from the wheel brake when the braking system is in a normal braking mode and exposing the master cylinder with the wheel brake during an occurrence of an electric failure, and an accumulator shut-off valve to diminish the capacity of the accumulator when the master cylinder is exposed to the wheel brake due to an electric failure.

7 Claims, 2 Drawing Sheets

ELECTRO-HYDRAULIC BRAKE APPLY SYSTEM

FIELD OF THE PRESENT INVENTION

The field of the present invention is that of an electro-hydraulic braking system for a motor vehicle.

SUMMARY OF THE INVENTION

The present invention provides an electro-hydraulic vehicle braking system which in a preferred embodiment provides normal braking, power assist, anti-locking braking system (ABS) and traction control (TC) modes of operation. Additionally, the present invention provides an electro-hydraulic braking system which can be integrated into a vehicle braking system for an electrically powered car which also utilizes regenerative braking.

DETAILED DESCRIPTION OF THE DRAWINGS

Figure 1:
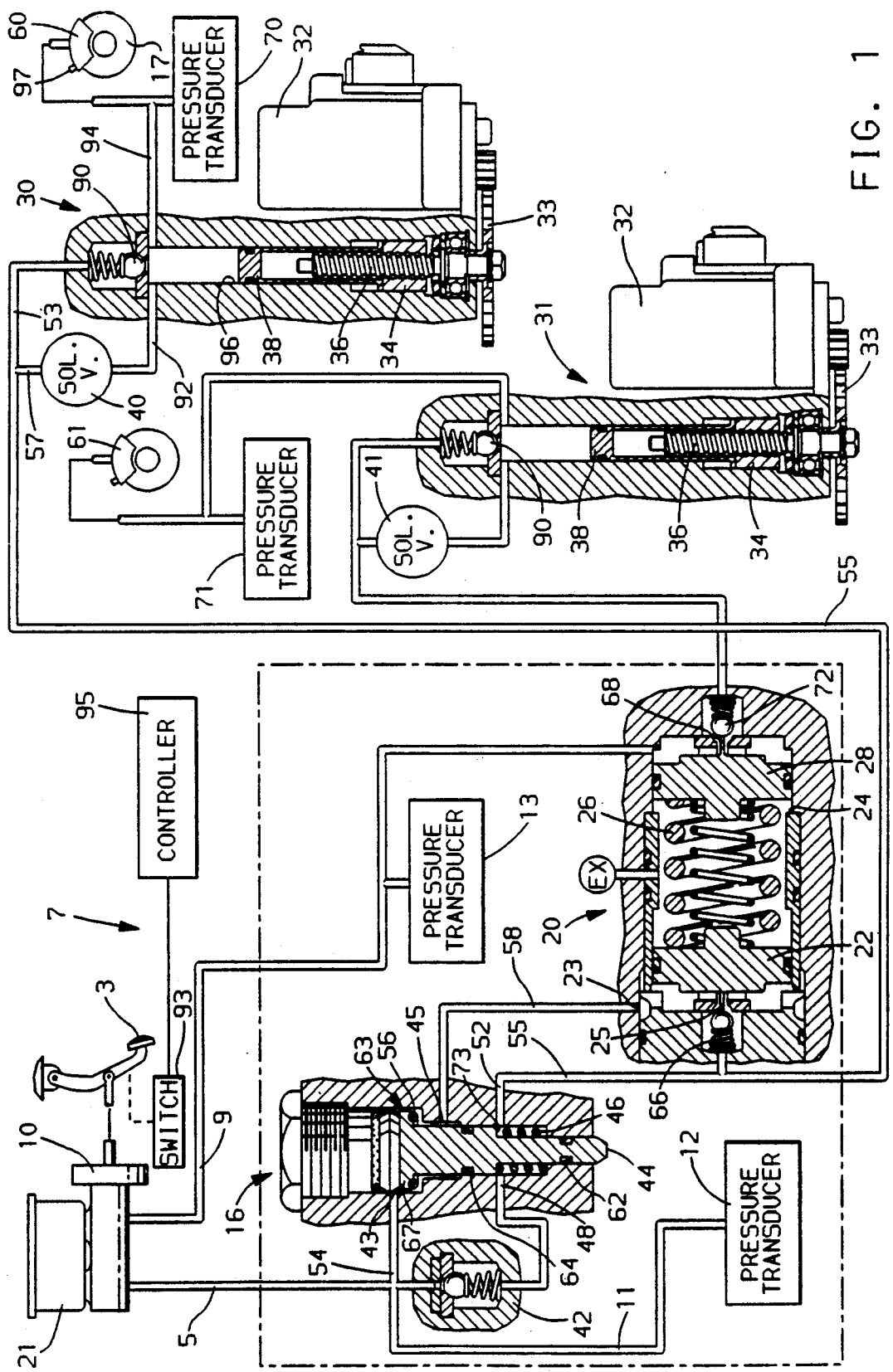
FIG. 1 is a schematic of a preferred embodiment of the present invention.

Referring to FIG. 1, the electro-hydraulic braking system 7 of the present invention has a conventional dual piston master cylinder 10 for a separate pressurization of dual braking circuits which feed into lines 5 and 9, respectively. The master cylinder 10 has a mechanical force delivered to it by a brake pedal and rod combination 3 which is actuated by a vehicle operator.

Pressurized fluid as mentioned previously is fed from the master cylinder 10 to a line 5. Pressurized fluid in line 5 branches off into line 11 where it acts upon a first alpha pressure transducer 12. The pressure transducer 12 feeds a signal of the pressure within the master cylinder to a controller 95.

The fluid in line 5 also passes through a check valve 42, past a port 48 of an accumulator shut-off valve 16 to a port 52 in line 55. Line 55 branches off to a line 57 to a normally open solenoid valve 40 into line 92 through a bore 96 of an electrically powered actuator 30 into adjoining line 94 to a fluidly actuated wheel brake 60 which restrains motion of the right front wheel 17. The actuator utilized may be similar to that shown and described in Matouka U.S. patent application Ser. No. 07/676,925, or Fabris et al U.S. Pat. No. 5,071,702 (an alternative cam actuated design) or as in Mikhaeil-Boules U.S. patent application Ser. No. 07/669,144, all commonly assigned.

In a normal mode of operation, movement of the pedal 3 will cause a closing of switch 93. Switch 93, either directly or via a signal given to controller 95, will actuate the solenoid valve 40 to a closed position. Therefore, fluid will not be allowed to flow through line 55 or line 57. Flow through a check valve 90 to the actuator bore 96 via a line 53 which bypasses the solenoid 40 will also be blocked off due to the closure of the check valve 90. Therefore, the normally open solenoid 40 when activated by the brake switch 93 becomes an isolation valve which isolates the master cylinder 10 from the wheel brake 60.

The first alpha transducer 12 in the normal braking operation, either directly or via a signal delivered to the controller 95, will then signal the electric actuator 30 to pressurize the wheel brake 60. Pressurization will occur due to a signal delivered to a motor 32 which turns via a gear train 33 a power screw 36 which is threadably engaged and inserted within a nonrotative nut 34 which is contacted and/or in many cases connected with a piston 38 to provide for reciprocal movement to control the pressure within the wheel brake 60. The actuator 30 not only provides the master cylinder function but also provides the function of a typical pressurize amplifier or booster; therefore, a conventional pneumatic or hydraulically powered booster to actuate the master cylinder 10 will not be required. The fluid pressure within the line 94 will often be up to five times as high as the fluid pressure within line 5; however, backpressure to the master cylinder is prevented by virtue of the check valves 42, 66, 72.

A beta pressure transducer 70 is also provided to read the actual pressure within the wheel brake 60. (An identical pressure transducer 71 is provided for the wheel brake 61.) Therefore, the controller 95 is not dependent upon a reading of the amperage supplied to the motor 32 to interpret the pressure within the wheel brake 60 but will have the actual pressure and, therefore, the beta transducer 70 provides a signal which allows feedback (usually via the controller 95) to modify the power supplied to the motor 32 to bring the pressure within the wheel brake 60 more in line with that desired by the vehicle operator as read via the first alpha pressure transducer 12.

To permit the vehicle operator to have the brake pedal feel typically associated with present motor vehicles, an accumulator 20 is provided. In normal braking operation, the fluid from the master cylinder 10 flows through line 5 and then, via lines 54 and 58, flows into the accumulator 20 through an entrance 23 to the left of an accumulator piston 22. The accumulator piston 22 is biased by a spring 26 which also biases in an opposite direction a right-hand accumulator piston 28 which is acted upon by the fluid flowing through line 9 to provide compliance for the other fluid circuit of the master cylinder 10.

There is provided a shoulder stop 24 for the right-hand piston 28 which limits its travel in a leftward direction. The left-hand piston 22 does not have associated stop in close proximity and, therefore, most of the compliance for the braking system 7 is taken up in movement of the left-hand piston 22 which will travel during a brake actuation cycle further to the center of the accumulator 20 than will the right-hand piston 28.

Between the accumulator 20 and the master cylinder 10 is an accumulator shut-off valve 16. The accumulator shut-off valve has a slidably mounted spool 63. The spool 63 has a flange 67 which captures a rubber seal 56. The fluid line 54 connected with the inlet 43 allows incoming pressurized fluid to enter the accumulator shut-off valve, which thereafter flows underneath the rubber seal 56 to exit out exit 45 into line 58, proceeding thereafter to the accumulator 20. The spool 63 has a seal 62 which seals the spool from atmospheric pressure acting upon portion 44. A spring 46 pushes the spool 63 upward by contact with a shoulder 73. The spool 63 has a sealing ring 64 which seals the secondary diameter of the spool 63.

When the solenoid valve 40 is closed and the master cylinder is pressurized, fluid within lines 55 and 52 will be hydraulically locked, thereby retaining this spool 63 in an upright position created by the biasing of spring 46. This upward position of the accumulator shut-off valve will allow fluid to flow through line 54, underneath the rubber seal 56 to line 58 to the accumulator 20. The accumulator piston 22 has a stud member 25 which opens a check valve 66. However, the influx of fluid into the accumulator will cause the piston 22 to move rightward, thereby allowing the check valve 66 to close. Therefore, in normal operation the accumulator 20 shut-off valve 16 will be in an open position allowing fluid from the master cylinder to flow into the accumulator 20. Therefore, the vehicle operator has the feel of a conventional vehicle braking system.

In cases of an electric failure, the solenoid valves 40 (and 41) will open, allowing fluid flow to the wheel brake from the master cylinder 10. Since fluid now flows through lines 55 and through check valve 42, the pressure acting upon the shoulder 73 of the accumulator valve spool 63 will be greatly diminished. The pressure entering line 55 will act upon the largest diameter of the spool 63, causing the spool 63 to push down upon the rubber seal 56, thereby cutting off fluid flow from line 54 to line 58. Therefore, the flow to the accumulator 20 will be cut off and the pressurized fluid from the master cylinder 10 will only act against the wheel brakes 60 and 61. Return flow to the master cylinder 10 from the wheel brake 60 will occur through check valve 66 through line 58 since the stud 25 on the accumulator piston 22 is keeping the check valve 66 in an open position. The return flow will lift up the spool 63, allowing the flow to pass back up through line 5. In cases of electric failure, an accumulator shut-off valve is not required in cooperation with the right-hand piston 28 of the accumulator 20 due to the physical stop 24 which limits the accumulative affect of the right-hand piston 28 to an acceptable small amount in emergency operations.

As a backup, a second alpha pressure transducer 13 is provided to allow the system 7 to maintain operations in case of a failure of the first alpha transducer 12. The transducer 13 also can notify the driver of a hydraulic failure in circuits 5, 55, 9.

In like manner, the left-hand wheel brake 61 has an actuator 31 essentially identical as that previously described along with a solenoid valve 41 identical to that of 40.

As shown, the actuators 30, 31 have a check valve 90. The check valve 90 is typically set to blow off at approximately 200 to 300 p.s.i. differential pressure. The check valve 90 is provided since the spring used in most normally open solenoids is not sufficiently strong to open the solenoid whenever there is pressure on its outlet greater than its inlet of a sufficient magnitude. In the circuit shown, if the actuator 30 was pressurizing the wheel brake 60 during an electric failure, there would be no way to relieve the pressure from the wheel brake 60. To overcome this problem, the check valve is provided which will open up whenever the pressure in the wheel brake 60 is over 200 p.s.i. higher than the pressure in the master cylinder 10. (Upon removal of the vehicle operator's foot from the pedal 3, the master cylinder 10 will be in a released position, and the accumulator pistons 28 and 22 will be in a position wherein their studs 66, 68 are opening the check valves 66 and 72.) The need for check valves 90 to provide for electric failure mode release failure during a pressurizing cycle can be deleted by eliminating the line 53 and installing a more expensive solenoid valve 40' in place of solenoid valve 40, which features a spring sufficiently strong to open up against the differential pressure on the inlets and outlets of the solenoid valve.

When a requirement for the ABS mode of operation is sensed by a sensor 97, the controller 95 will not have signaled the solenoid 40 to close since it has already been closed by operation of switch 93. The pressure within the wheel brake will be modulated by the actuator 30 by the controller 95 in an ABS mode rather than following the dictates of the signal generated by the first alpha pressure transducer 12. (Note: As illustrated, the piston 38 is in a fully retracted position. It will be in an extended position at any time brake pressure is present and can thus be returned toward its retracted position to reduce pressure within the wheel brake.) During ABS mode, transducers 70, 71 provide additional system feedback information to controller 95 for more precise wheel brake control.

Figure 2:
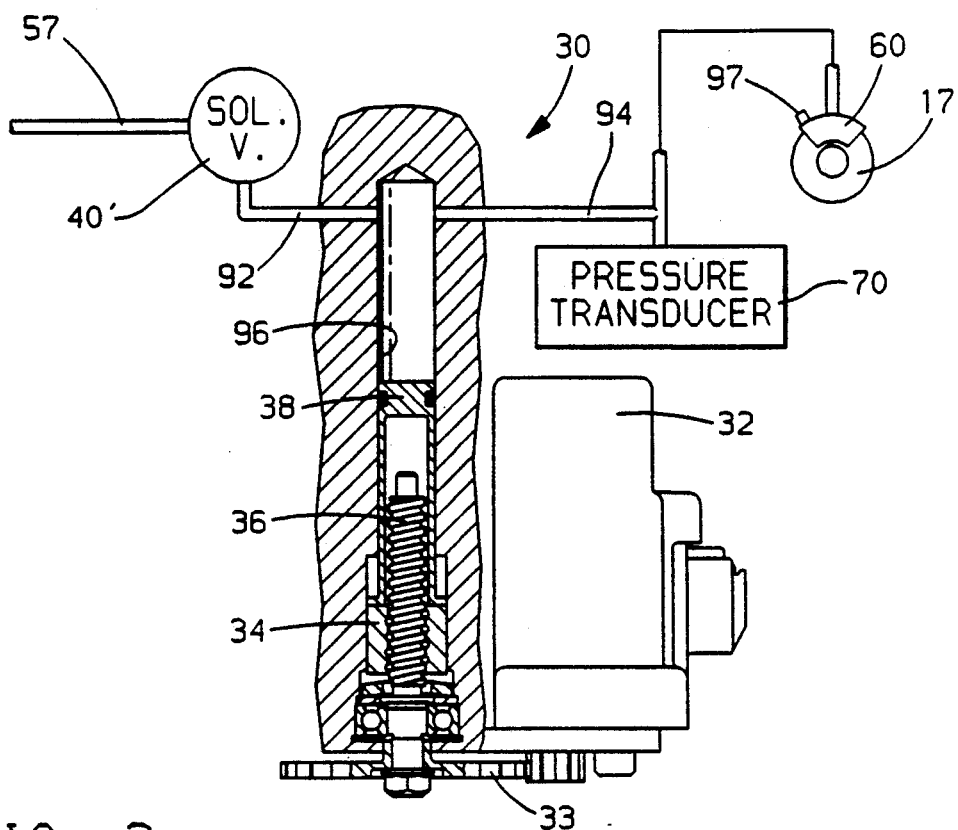
FIGS. 2 and 3 are schematics of partial modifications of the embodiment of the present invention shown in FIG. 1.

Referring to FIG. 2, traction control mode of operation is desirable, the more expensive solenoid 40' as mentioned previously can be installed and will close upon actuation by the controller 95 and, thereafter, traction control will be effected by actuation of the actuator 30. In an alternative embodiment not shown, a less expensive solenoid check valve may be installed on lines 5 and 9 in addition to the braking system as shown in FIG. 1. The new solenoid valves will be signaled to close to isolate the wheel brakes 60,61 from the master cylinder 10 whenever the system 7 goes into the traction control mode.

Figure 3:
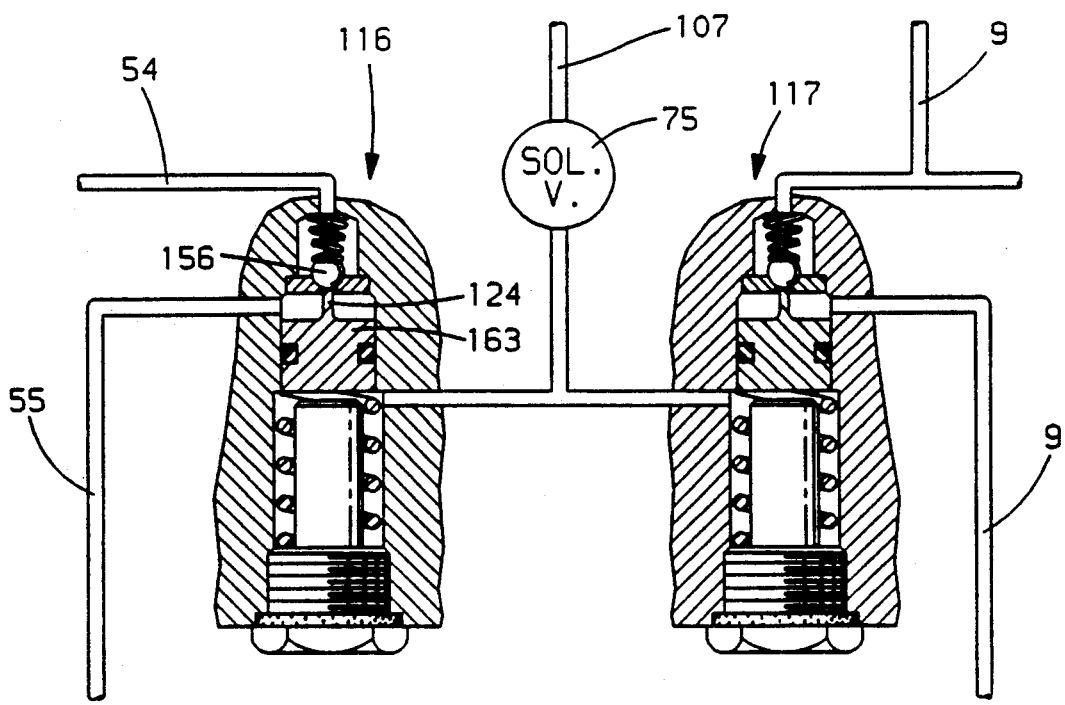

Referring to FIG. 3, a slightly different version of the accumulator shut-off valve 116 is provided. The accumulator shut-off valve 116 in FIG. 3 has a normally open solenoid valve 75 with a line 107 to a master cylinder fluid reservoir 21 (FIG. 1). When closed, the solenoid valve 75 provides a fluid lock keeping up a spring biased piston 163 which has a stud 124 opening a check valve 156. Flow through line 54 is allowed through the check valve 156 to the accumulator 20 via line 55. Upon an electrical failure, the solenoid valve 75 will open, allowing the piston 163 to be moved downwardly, thereby allowing fluid pressure in line 54 to close off the check valve 156, thereby ending fluid flow to the accumulator 20. The above-described approach has typically been found to be the less desirable due to the requirement of the additional solenoid valve 75.

If desired, another accumulator shut-off valve 117 can be provided for the other fluid circuit 9, and the stop 24 can be eliminated.

One major advantage of the present invention is that the controller 95 can communicate with a regenerative braking system so that at higher speeds, the regenerative braking system will be utilized, and thereafter, the controller will gradually utilize the actuator 30 to increasingly supply the additional requested braking force, thereby maximizing reliance on the regenerative braking system.

While various embodiments of the present invention have been explained, it will be apparent to those skilled in the art of the various modifications which can be made without departing from the spirit or scope of the present invention as it is encompassed by the following claims.

The embodiments of the invention in which an exclusive property or privilege is claimed are defined as follows:

1. An electro-hydraulic braking system for a fluid actuated wheel brake of a motor vehicle having a normal mode of operation when the wheel brake can be electrically powered fluid actuated or relieved and in an electric failure mode wherein the wheel brake can be fluidly actuated or relieved resulting from a mechanical input comprising:

master cylinder means for delivering pressurized fluid in response to a mechanical input;

alpha first pressure transducer means for providing a signal in response to a pressure of the fluid delivered by the master cylinder means;

accumulator means for acceptance of pressurized fluid from the master cylinder means;

electric actuator means for delivering and relieving pressurized fluid to the wheel brake in response to the signal given by the alpha pressurizer transducer means in a normal mode of operation of the braking system;

isolation valve means isolating the master cylinder from the wheel brake when the braking system is in a normal braking mode and to expose the master cylinder means with the wheel brake during an occurrence of an electric failure; and accumulator shut-off valve means to diminish the capacity of the accumulator means when the master cylinder means is exposed to the wheel brake due to an electric failure.

2. A braking system as described in claim 1 wherein the isolation valve means comprises a solenoid valve which is normally open.

3. A braking system as described in claim 2 wherein the solenoid valve is activated to the closed position by a switch actuated by the mechanical input to the master cylinder means.

4. A braking system as described in claim 1 further including a controller means to independently signal the electric actuator means to provide anti-lock braking actuation for the vehicle brake.

5. A braking system as described in claim 1 further comprising controller means to independently signal the electric actuator means to provide traction control braking actuation of the vehicle brake.

6. A braking system as described in claim 1 further comprising a first beta pressure transducer for providing a feedback signal for the electric actuator means to modify the response of the electric actuator means to more closely approximate the pressure signaled by the first alpha pressure transducer.

7. An electro-hydraulic braking system for a fluid actuated brake of a motor vehicle comprising:

a master cylinder for delivering pressurized fluid in response to a mechanical input;

an alpha pressure transducer for providing a signal in response to the pressure delivered by the master cylinder;

an accumulator for acceptance of pressurized fluid from the master cylinder;

an electrically powered fluid actuator for delivering and relieving pressurized fluid to the brake in response to a signal given by the alpha pressure transducer in a normal mode of operation;

a normally open solenoid isolating the master cylinder from the brake when the braking system is in a normal braking mode and exposing the master cylinder to the brake during an electric failure;

controller means for signaling the electrically powered fluid actuator independently of the signal given by the alpha transducer to provide for control of the electric actuator in anti-lock braking mode of operation;

beta transducer means fluidly connected with the wheel brake for determining the pressure within the wheel brake and signaling the electrically powered fluid actuator to allow the electrically powered fluid actuator to modify the response of the electrically-powered fluid to more closely correspond to a desired response signaled by the alpha transducer means;

an actuator shut-off valve to diminish the capacity of the accumulator when the master cylinder is exposed to the brake; and switch means to actuate the solenoid valve to a closed position whenever the master cylinder has a mechanical input.

* * * * *